United States Patent [19]

Forbert et al.

[11] Patent Number: 5,680,713

[45] Date of Patent: Oct. 28, 1997

[54] PROCESS FOR THE SUBCRITICAL DRYING OF AEROGELS

[75] Inventors: Rainald Forbert, Flörsheim; Andreas Zimmermann, Griesheim, both of Germany; Douglas M. Smith; William Ackerman, both of Albuquerque, N. Mex.

[73] Assignee: Hoechst Aktiengesellschaft, Frankfurt, Germany

[21] Appl. No.: 611,058

[22] Filed: Mar. 5, 1996

[51] Int. Cl.$^6$ ........................................ F26B 3/00
[52] U.S. Cl. ........................................ 34/342; 34/337
[58] Field of Search ........................ 34/329, 330, 337, 34/339, 340, 341, 342, 405

[56] References Cited

U.S. PATENT DOCUMENTS

| | | | |
|---|---|---|---|
| 2,503,913 | 4/1950 | Kimberlin, Jr. et al. | 34/337 |
| 4,080,743 | 3/1978 | Manos | 34/342 |
| 4,667,417 | 5/1987 | Graser et al. | 34/337 |
| 5,243,769 | 9/1993 | Wang et al. | 34/27 |
| 5,473,826 | 12/1995 | Kirkbir et al. | 34/405 |

*Primary Examiner*—Henry A. Bennett
*Assistant Examiner*—D. Doster
*Attorney, Agent, or Firm*—Curtis, Morris & Safford, P.C.

[57] ABSTRACT

A process for the subcritical drying of a lyogel to give an aerogel comprises treating the lyogel with a heat transfer liquid which has a temperature above the boiling point of the pore liquid of the lyogel under the pressure of the system and subsequently separating the dried aerogel from the heat transfer liquid.

10 Claims, No Drawings

PROCESS FOR THE SUBCRITICAL DRYING OF AEROGELS

DESCRIPTION

Aerogels are highly porous materials of low density, which are prepared by forming a gel and then removing the liquid while substantially retaining the gel structure.

According to a narrower definition (see, for example, Gesser and Goswanni, Chem. Rev. 1989, 89, 767) aerogels are materials in which the liquid has been removed from the gel under supercritical conditions, whereas in the case of gel drying under subcritical conditions the term xerogels is used, and in the case of removal of the liquid from the frozen crate by sublimation the term cryogels is used.

Aerogels for the purposes of this invention include all these materials and as well as air can contain other desired gases. The gases can also be removed from the aerogel under vacuum.

Customary aerogels generally contain silicon oxide or metal oxide, and, because of their particularly low densities of 20 to 300 kg/m$^3$, have very large internal surface areas of over 500 m$^2$/g. As a result of these properties, they are outstandingly suitable as heat and sound insulators, catalyst carriers and adsorbents.

According to the prior art, the preparation of aerogels can be carried out in various ways using a sol-gel process followed by supercritical or subcritical drying, in which case the gel before drying can be in the form of a hydrogel (the pore liquid being water) or as a lyogel (the pore liquid being an organic solvent).

All prior art subcritical processes for drying lyogels to give aerogels provide the heat necessary to evaporate the solvent by contact with a heated surface (contact drying), by electromagnetic waves (for example microwave drying) or by treatment with flowing gas (convection drying) (see, for example, DE-A-43 16 540). Because low densities are necessary for the use of aerogels as thermal insulators, the lyogels before drying have only very low solids contents (for example, 6–8% SiO$_2$). The remaining 92–94% of the gel is solvent which has to be evaporated. In the present case, the heat transfer for drying causes problems because aerogels are extremely good thermal insulators. In addition to the very energy- and cost-intensive dielectric drying processes, the already dried aerogel particles shield the moist particles so effectively from the heat transfer necessary for drying that, with the conventional processes, only very time-consuming drying processes are possible in spite of high temperature gradients. On the industrial scale, this leads unavoidably to large, cost-intensive dryers and poor utilization of heat.

It is an object of this invention to provide a process for drying lyogels to give aerogels, which does not have the disadvantages of the known drying processes and can be carried out in a technically efficient way.

Surprisingly, it has now been found that heat is transferred from a liquid to solvent-moist gel particles, distributed therein so effectively that the particles are protected by the outflowing vapor from penetration by the surrounding heat transfer liquid into the porous solid structure, and that the drying takes place in a fraction of the time otherwise needed for aerogels, in spite of low temperature gradients.

This invention accordingly provides a process for the subcritical drying of a lyogel to give an aerogel, which comprises treating the lyogel with a heat transfer liquid which has a temperature above the boiling point of the pore liquid of the lyogel under the pressure of the system and subsequently separating the dried aerogel from the heat transfer liquid.

Using the process of the invention, lyogels can be dried to give aerogels in a cost-effective manner with good utilization of heat.

In principle, all organic and inorganic lyogels from the known synthetic methods which can be used as precursors for an aerogel are suitable as starting materials for the process of the invention (see, for example, Jeffrey Brinker, George W. Scherer, Sol/Gel Science: The Physics and Chemistry of Sol/Gel Processing, Academic Press Ltd., London 1990; U.S. Pat. No. 5,081,163; U.S. Pat. No. 4,873,218; U.S. Pat. No. 4,997,804). Starting materials used are, for example, silicon compounds, melamine-formaldehyde compounds, resorcinol resins, phenolic resins, aminoplasts, urea-formaldehyde resins, and composite materials consisting of one of the above-described gels in combination with an engineering plastic, for example polystyrene.

Preference is given to SiO$_2$ lyogels that have been rendered hydrophobic by surface modification; see, for example, WO-A 94/25 149.

It is advantageous to select a heat transfer liquid for the drying that wets the dry particles minimally, if at all.

It is also advantageous if the heat transfer liquid is immiscible or only partly miscible with the pore liquid, i.e. the solvent of the lyogel.

The temperature difference between the heat transfer liquid and the boiling point of the pore liquid of the lyogel under the pressure of the system is preferably at least 1 kelvin, more preferably at least 10 kelvin, and particularly preferably 30 kelvin.

A suitable heat transfer liquid is preferably water or aqueous solutions, for example a solution of sodium chloride.

The gels to be dried are customarily present in, preferably technical grade, organic solvents, for example alcohols with preferably from 1 to 8 carbon atoms, ethers, ketones, such as acetone, esters, halogenated hydrocarbons, such as methylene chloride or chloroform, or hydrocarbons, preferably aliphatic hydrocarbons, such as hexane or heptane.

To carry out the process of the invention, the lyogel can, for example, be transferred into the heat transfer liquid by a pneumatic conveyor, in which case the conveying medium can be either a gas such as air or a liquid such as the heat transfer liquid or the pore liquid, preferably the heat transfer liquid. If the pore liquid of the lyogel has a higher density than the heat transfer liquid, the lyogel can simply be applied to the surface of the heat transfer liquid. Here, the heat transfer liquid can be present in a bath, for example in a flotation basin, or else be recirculated by a pump.

In a preferred embodiment, the dried aerogel is separated from the heat transfer liquid by utilizing the difference in density between the wet and the dried material, for example using gravitation by means of a flotation apparatus or using centrifugal force by means of a decanter.

In a particularly preferred embodiment, the buoyancy of the aerogel is utilized to bring it to the surface of the heat transfer liquid, where it is skimmed off; the process then being preferably carried out in a flotation cell.

The present invention accordingly also provides an apparatus for carrying out the process described above, comprising a directly or indirectly heated flotation basin to contain the heat transfer liquid and a pneumatic feeder to introduce the lyogel into the heat transfer liquid.

In a further embodiment of the process of the invention, the lyogel is presented, for example on a belt filter, and the heat transfer liquid is applied, for example by spraying or sprinkling by means of a washing apparatus.

The present invention accordingly also provides an apparatus for carrying out the process described above, comprising a belt filter to receive the lyogel and a washing apparatus with whose aid the heat transfer liquid is applied to the lyogel.

Preferably the aerogel obtained by the drying is separated from the heat transfer liquid within two minutes, particularly preferably within 10 seconds.

Aerogels dried according to this present invention can be used, for example, as thermal and sound insulators, as catalyst carriers and as adsorbents.

To carry out the process of the invention, one or more features of the embodiments can be combined as desired.

The documents cited to in the description shall form part of the description by reference, and this applies in particular to the directions for the preparation of the starting lyogel.

An embodiment of the process of this invention will now be more particularly described by way of example.

EXAMPLE 1

An 8% strength by weight solution of $SiO_2$ is prepared by dilution of 75 ml of commercial sodium silicate solution (Hoechst) with 224 ml of deionized water. Sodium ions are removed by passing the solution through an ion exchange resin (Rohm and Haas Amberlite). The resin is held in a vertical jacketed column with a height of 50 cm and an internal diameter of 1 cm. The jacket of the column is held at 10° C. by means of a thermostat. Before the synthesis of the sol, the column is washed with a plurality of volumes of deionized water. The sodium silicate solution is applied to the column, and drawn off, at a controlled volume rate. The sodium silicate solution is discarded until the pH reaches a value in the range 2.5 to 2.9. The $SiO_2$ sol is collected until the exchange capacity of the resin has been reached. The resin is regenerated for further use by passing through it in succession deionized water, 5% by weight NaOH solution, 5% by weight HCl solution and again deionized water until the pH is about 5.

The pH of the $SiO_2$ solution is increased by the controlled addition of 1M-NaOH to 5 to start the gelation. Before the gelation, the solution is introduced into cylindrical vessels. After 30 minutes, the gel cylinders are removed from the vessels and placed in closed vessels filled with water. These vessels are placed in an oven where the gel is aged for 4 hours at 80° C. After the aging, the gel is cooled to room temperature.

The gel cylinders are repeatedly rinsed with acetone. The acetone is then washed out of the gel in the same with n-heptane. There are usually three washing stages in each case. After the last washing stage, the gel is treated with a solution consisting of n-heptane and 1–10% by weight of trimethylchlorosilane (TMCS). The solution is added to the gel in such an amount that a ratio of from 8 to 50% by weight of TMCS with respect to the wet gel is obtained. The gel is left overnight in the solution.

The heptane-moist lyogel cylinders thus rendered hydrophobic are enclosed in a hollow body consisting of wire gauze. The hollow body is immersed in a vessel of boiling water. On contact with the water, the heptane in the gel heats up and rapidly evaporates. The gel particles break apart because of the interior pressure gradients in the particle which form as a result of the rapid evaporation of the pore liquid. Within a few seconds, the fine gel rises to the surface of the water as a dry material. Because the dried aerogel has a density which is less than one tenth of the density of water and because it is hydrophobic it floats on the surface of the water, and can be skimmed off with a fine sieve.

The heptane from the gel pores, which is insoluble in water, rises in the water in the form of small bubbles of vapor, and is condensed in a condenser. The dried gel is a loose powder, and has a white, chalky appearance. The material has a bulk density of 80 $kg/m^3$ and a BET surface area ($N_2$) of 600 $m^2/g$.

What is claimed is:

1. A process for the subcritical drying of a lyogel to give an aerogel, which comprises treating the lyogel with a heat transfer liquid which has a temperature above the boiling point of the pore liquid of the lyogel under the pressure of the system and subsequently separating the dried aerogel from the heat transfer liquid wherein said dried aerogel is separated from the heat transfer liquid by utilizing the difference in density between the wet and dried materials.

2. The process as claimed in claim 1, wherein the heat transfer liquid is immiscible or only partly miscible with the pore liquid of the lyogel.

3. The process as claimed in claim 1, wherein the drying is carried out with heat transfer liquid that wets the dry aerogel only minimally, if at all.

4. The process as claimed in claim 1, wherein $SiO_2$ lyogels are dried which have been rendered hydrophobic by surface modification.

5. The process as claimed in claim 1, wherein water is used as the heat transfer liquid.

6. The process as claimed in claim 1, wherein the buoyancy of the aerogel is utilized to bring it to the surface of the heat transfer liquid, where it is skimmed off.

7. The process as claimed in claim 1, wherein the lyogel is presented on a belt filter and the heat transfer liquid is applied to the lyogel by means of a washing apparatus.

8. Apparatus for carrying out the process of claim 1, comprising a heated flotation basin to contain the heat transfer liquid and a pneumatic feeder to introduce the lyogel into the heat transfer liquid.

9. Apparatus for carrying out the process of claim 7, comprising a belt filter to receive the lyogel and a washing apparatus to apply the heat transfer liquid to the lyogel.

10. The use of an aerogel dried by a process as claimed in claim 1, as a thermal or sound insulating material, as a catalyst carrier or as an adsorbent.

* * * * *